United States Patent
Trösch (10) Patent No.: US 12,306,602 B2
(45) Date of Patent: May 20, 2025

(54) BUILDING SYSTEM FOR PRIVATE USER COMMUNICATION

(71) Applicant: INVENTIO AG, Hergiswil (CH)

(72) Inventor: Florian Trösch, Erlenbach (CH)

(73) Assignee: Inventio AG, Hergiswil (CH)

( * ) Notice: Subject to any disclaimer, the term of this patent is extended or adjusted under 35 U.S.C. 154(b) by 324 days.

(21) Appl. No.: 17/786,797

(22) PCT Filed: Dec. 2, 2020

(86) PCT No.: PCT/EP2020/084199
§ 371 (c)(1),
(2) Date: Jun. 17, 2022

(87) PCT Pub. No.: WO2021/121989
PCT Pub. Date: Jun. 24, 2021

(65) Prior Publication Data
US 2023/0012098 A1    Jan. 12, 2023

(30) Foreign Application Priority Data

Dec. 20, 2019  (EP) ..................................... 19218491

(51) Int. Cl.
*G05B 19/042* (2006.01)

(52) U.S. Cl.
CPC .. *G05B 19/042* (2013.01); *G05B 2219/25011* (2013.01)

(58) Field of Classification Search
None
See application file for complete search history.

(56) References Cited

U.S. PATENT DOCUMENTS

| 7,353,915 B2 * | 4/2008 | Zaharia ................... B66B 1/468 187/391 |
| 9,617,115 B2 * | 4/2017 | Sarjanen ............... B66B 1/2458 |
| 10,000,362 B2 * | 6/2018 | Nagata .................. B66B 13/143 |
| 10,358,319 B2 * | 7/2019 | Salmikuukka ........ B66B 1/2458 |
| 10,544,007 B2 * | 1/2020 | Hwang ................. B66B 5/0012 |

(Continued)

FOREIGN PATENT DOCUMENTS

| AU | 2018389641 A1 | 5/2020 |
| CN | 103460259 A | 12/2013 |

(Continued)

OTHER PUBLICATIONS

International Search Report for International Application No. PCT/EP2020/084199 dated Feb. 22, 2021.

*Primary Examiner* — Jason Lin
(74) *Attorney, Agent, or Firm* — Knobbe, Martens, Olson & Bear, LLP (57) ABSTRACT

A building system comprises a camera system and an image processing device, which generates a real-time face template for facial features of the user from a camera capture of a user when the user is in a building zone. A control and processing device searches a storage device for a reference face template that matches the real-time face template to a specified degree, wherein the user is a registered user if there is a match. A bidirectional communication channel for private communication between the building system and a mobile phone of the user is determined from the user profile of the user.

7 Claims, 2 Drawing Sheets

(56) References Cited

U.S. PATENT DOCUMENTS

| | | | |
|---|---|---|---|
| 10,679,443 B2* | 6/2020 | Grigorov | G06V 40/174 |
| 11,050,920 B2* | 6/2021 | Yu | H04N 23/959 |
| 2003/0169337 A1* | 9/2003 | Wilson | H04N 7/181 |
| | | | 348/E7.086 |
| 2005/0110610 A1 | 5/2005 | Bazakos et al. | |
| 2005/0110637 A1* | 5/2005 | Rao | G08B 21/0202 |
| | | | 348/148 |
| 2007/0291118 A1* | 12/2007 | Shu | H04N 7/18 |
| | | | 348/E7.085 |
| 2008/0041943 A1* | 2/2008 | Radicella | G07C 9/00571 |
| | | | 235/382 |
| 2008/0222963 A1* | 9/2008 | Zwart | G07C 9/00944 |
| | | | 70/277 |
| 2011/0248851 A1* | 10/2011 | Pham | G07C 9/257 |
| | | | 340/572.1 |
| 2012/0169465 A1* | 7/2012 | Chang | B60W 50/00 |
| | | | 340/5.83 |
| 2013/0153339 A1* | 6/2013 | Sarjanen | B66B 1/2408 |
| | | | 187/382 |
| 2014/0320391 A1* | 10/2014 | Bazaz | G06F 3/041 |
| | | | 455/574 |
| 2015/0015365 A1 | 1/2015 | Ortiz et al. | |
| 2015/0221151 A1 | 8/2015 | Bacco et al. | |
| 2015/0379333 A1* | 12/2015 | Ingram | H04N 25/46 |
| | | | 348/46 |
| 2016/0239705 A1* | 8/2016 | Masood | G06V 40/50 |
| 2017/0291795 A1* | 10/2017 | Scoville | B66B 1/2408 |
| 2018/0158269 A1* | 6/2018 | Friedman | G07C 9/00174 |
| 2020/0334930 A1* | 10/2020 | Masood | G07C 9/257 |

FOREIGN PATENT DOCUMENTS

| | | |
|---|---|---|
| CN | 105934778 A | 9/2016 |
| CN | 106485822 A | 3/2017 |
| CN | 106981112 A | 7/2017 |
| EP | 1241633 A2 | 9/2002 |
| IN | 201947040289 | 10/2019 |
| JP | 2015-105160 A | 6/2015 |
| JP | 2017-128417 A | 7/2017 |
| JP | 2018036946 A | 3/2018 |
| JP | 2018-065640 A | 4/2018 |
| WO | WO 2010/112586 A1 | 10/2010 |
| WO | WO 2014163830 A1 | 10/2014 |
| WO | WO 2019121335 A1 | 6/2019 |
| WO | WO 2021121989 A1 | 6/2021 |

* cited by examiner

BUILDING SYSTEM FOR PRIVATE USER COMMUNICATION

TECHNICAL FIELD

The technology described herein relates generally to a building system that performs one or more services in or for a building. In particular, embodiments of the technology relate to a building system that performs a communication service, and to a method for operating such a building system.

SUMMARY

Building systems can be designed in a wide variety of ways for a wide variety of applications. In a building, for example, it may be desirable to detect the presence of a user in the building. This desire may lie with the user, who wishes to orient himself in the building, for example after entering the building. The desire may also exist on the part of the building management, which would like to know, for example, whether and when a user is in the building and which service the user would like to use in the building.

The presence of a user can be detected, for example, with an access control system, which is an example of a building system. The access control system controls, for example, access to a restricted area (for example, a building entrance or floor corridors with access to elevators). In such an access control system, users who want to use the service of the access control system can identify themselves as authorized in different ways, for example with a key, a magnetic card, chip card, or RFID card, or a mobile electronic device (for example, mobile phone). WO 2010/112586 A1 describes an access control system in which a mobile phone carried by a user transmits an identification code to an access node. If the identification code is identified as valid, the access node transmits an access code to the cell phone, which displays the access code on a display. If the user holds the displayed access code up to a camera, the access control system checks whether the detected access code is valid. If the code is valid, the user is granted access.

Another example of a building system is an elevator system installed in the building. In order to use the service of the elevator system, a user can for example, input an elevator call at a floor call terminal in order to be transported from a boarding floor to a destination floor. Depending on the type and purpose of a building, the elevator system and the access control system can be configured in such a way that an elevator call is initiated when the user is granted access; the elevator call can be made to a specified destination floor that is stored in a user profile created for the user.

These building systems recognize the presence of a user, deduce which service the user wants to use, and react accordingly. Although a user can, for example, change the specified destination floor because the user would like to be transported to another floor, there are generally no other interaction options between the building system and the user. There is therefore a need for a building system that offers additional interaction options.

One aspect of such a technology relates to a method for operating a building system for a building, in particular for a building in which an elevator system and/or an access control system are present. The building system comprises a camera system, an image processing device communicatively connected thereto, a control and processing device communicatively connected to the image processing device, a storage device communicatively connected to the control and processing device, and a communication device communicatively connected to the control and processing device. The camera system is located in a building zone accessible to users who carry mobile devices and users who do not carry mobile devices. A real-time face template for facial features of a user is generated when the user is in the building zone, wherein the real-time face template is generated by the image processing device from a camera capture of the user. Under the control of the control and processing device, the storage device is searched for a reference face template stored in the storage device that matches the real-time face template to a specified degree. If they match, the user is recognized as a registered user for whom a user profile is stored in the storage device. The user's user profile is read by the control and processing device in order to determine a bidirectional communication channel for private communication between the building system and the user. Controlled by the control and processing device, a first data signal is transmitted by the communication device via the determined bidirectional communication channel to the mobile phone of the user.

Another aspect of the technology relates to a building system for a building, in particular for a building in which an elevator system and/or an access control system is present. The building system has a camera system that is arranged in a building zone that is accessible to users who carry mobile devices and users who do not carry mobile devices, and has an image processing device that is communicatively connected to the camera system and that is configured to generate a real-time face template for facial features of the user from a camera capture of a user when the user is in the building zone. The building system also has a storage device in which a plurality of user profiles is stored, wherein each user profile is assigned to a user and comprises a reference face template of the user and information about a communication channel preferred by the user. A communication device is configured to transmit and receive data signals over a communication network. A control and processing device is communicatively connected to the image processing device, the storage device and the communication device, and is configured to search the storage device for a reference face template that matches the real-time face template to a specified degree, wherein the user is a registered user if there is a match. The control and processing device is also configured to read the user's user profile in order to determine the bidirectional communication channel for private communication between the building system and the user, and to transmit a first data signal to the user through the communication device via the bidirectional communication channel determined for the user.

The technology described here creates a building system that, after recognizing a registered user by means of facial recognition, can communicate with the user via a communication channel selected by the user. Face recognition is preferably done in a way that is as unobtrusive as possible to users and does not disrupt users' flow of movement; credentials (for example, photo IDs, RFID cards) therefore do not have to be shown. This reduces the risk, especially in the case of heavy traffic volume, of a line forming in front of the access.

It can be assumed that a registered user who saves their reference face template consents to the use of facial recognition technology. Additionally, in one embodiment, the user's initial response (and any subsequent response) to a message received over the private communication channel may constitute consent to the use of the technology.

In contrast to known building systems, in which communication for all users takes place the same way via information devices and/or operating devices permanently installed in the building as communication channels, the communication channel is selected by the user according to the technology described here. The communication channel is established via the user's mobile device, which the user is familiar with using. It is therefore not necessary for the user to first go to an information device and/or operating device, possibly have to wait behind other users there, and then have to deal with the operation of the information devices and/or operating devices. Instead, the technology described here allows location-independent communication using the mobile phone. Any input (manual and/or by voice) by the user is made using their (own) mobile phone. There is no need to make entries on an information device and/or operating device touched by a plurality of users, and this can be advantageous from a hygienic point of view.

In addition, the technology described here can also be used advantageously for users with impaired vision or blindness. Such a user is recognized by the facial recognition mentioned, without having to search out an information device and/or operating device, locate it by touch, and undertake an operation with it, by way of example. If such a user selects their mobile phone as the communication channel, the communication takes place via the mobile phone that they are familiar with; information can, for example, be transmitted by the mobile phone as a voice message. Any input can be made by the user manually and/or by voice on their own mobile device.

The technology described here also protects the privacy of users because it is a private communication, i.e., information transmitted from the building system to the user, or vice versa, cannot be viewed by bystanders. Users who want to keep secret their destination in the building or the purpose of their stay in the building may see this as a benefit; for a female user it may be an advantage that their destination floor and their assigned elevator is not visible to bystanders, for example. The same would be the case for a user who wants to visit a debt counselor or a specialist in the building.

The technology described here also offers flexibility in terms of the communication channel. The bidirectional communication channel can, for example, comprise a telephone service, an email service, a multimedia or text message service, or a service for social media, wherein the bidirectional communication channel for the user can be used by means of a portable mobile phone. These are communication channels that users are familiar with.

A plurality of communication channels can be specified in the user profile. If a plurality of communication channels is defined, one of them can be defined as the preferred communication channel. The user can define when to use another communication channel rather than the preferred one, for example by one or more rules and/or conditions. For example, a ranking can be established; if the preferred communication channel (for example, a special chat service) is not available, another chat service should be used, for example, before a telephone service is selected. For example, a rule can specify times during which the private communication channel is to be selected.

In one embodiment, a second data signal is received by the communication device via the determined bidirectional communication channel. The second data signal relates to a user's response to the first data signal. The user can enter this reaction on their mobile device.

In one embodiment, the message transmitted by the first data signal comprises user-specific information, for example a question or a request for confirmation, rejection or modification of the user-specific information. The second data signal can therefore comprise an answer to the question or a confirmation, rejection or modification of the user-specific information.

In one embodiment, the control and processing device can generate a control signal as a function of the second data signal, the control signal relating to execution of a building action specified by the user-specific information. The user-specific information can relate to an elevator call, for example. The user can therefore use the mobile phone they are familiar with to input an elevator call and/or to confirm a proposed destination floor.

In one embodiment, the technology described here can also be used if the user profile does not contain any information about a bidirectional communication channel, or if the user does not have a mobile phone. For this purpose, the building system is configured in such a way that the first data signal is transmitted to an information device that is arranged in the building zone. The information can be transmitted to such a user from there.

BRIEF DESCRIPTION OF THE DRAWINGS

Various aspects of the improved technology are described in greater detail below with reference to embodiments in conjunction with the drawings. In the drawings, identical elements have identical reference signs, wherein.

DETAILED DESCRIPTION

Figure 1:
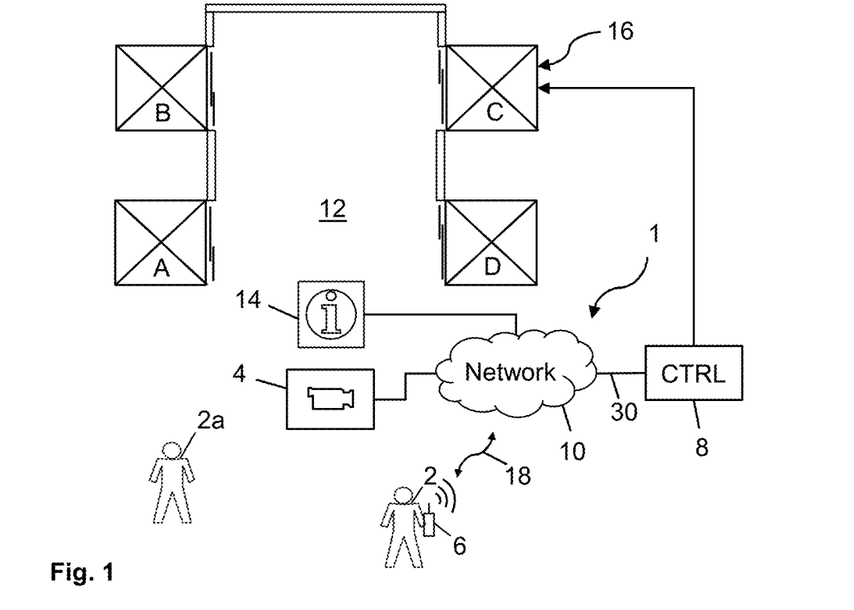
FIG. 1 is a schematic illustration of an application example of a building system in conjunction with an example of a situation in a building.

FIG. 1 is a schematic illustration of an application example of an access control system 1 in conjunction with an example of a situation in a building. For purposes of illustration, only a few walls, rooms 5 and zones 12 of the building are shown. The rooms 5 may be, for example, apartments, halls and/or elevator cars of an elevator system 16. The building zone 12, in one embodiment, may be a public zone from which restricted-access zones, such as, for example, the rooms 5 or the elevator system 16, can be entered. In this embodiment, the building system 1 can be a subsystem or subordinate system of an access control system that monitors the building zone 12, and/or of the elevator system 16. In a further embodiment, the building system 1 can be a system that is independent of another system, in particular of an access control system or of an elevator system. In the building system 1 application shown in FIG. 1, there are several users 2, 2a in the building zone 12. One user 2 is carrying a mobile electronic device 6 (hereinafter also referred to as a mobile phone 6), and one user 2a is not carrying such a mobile phone 6.

Figure 4:
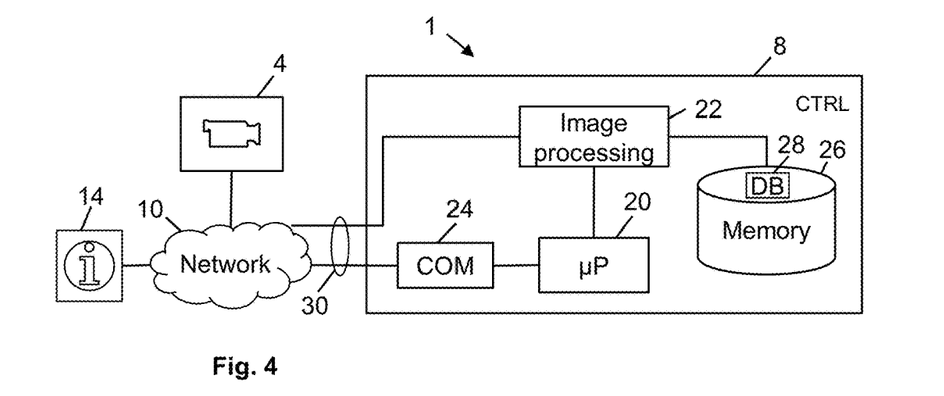
FIG. 4 shows a schematic illustration of an embodiment of an access control system.

FIG. 1 also shows a camera system 4, an information device 14, and a control and processing device 8 (CTRL in FIG. 1), which are communicatively connected to a communication network 10. As shown in FIG. 4, the control and processing device 8 contains an image processing device 22, and contains a storage device 26 which stores user profiles and associated face templates of registered users 2, 2a. The control and processing device 8 can be arranged inside the building or outside the building. In one embodiment, the control and processing device 8 can be arranged entirely or partially in an off-site control center, or implemented as an IT infrastructure made available via the Internet (also referred to as "cloud computing"). The communication connection between the control and processing device 8 and the communication network 10 is indicated by a communication connection 30. Also indicated is the fact that a communication connection 18 can exist between the mobile phone 6 of the user 2 and the communication network 10. Further structural properties of the building system 1 and the control and processing device 8 are described in conjunction with FIG. 4.

In the example of a situation shown in FIG. 1, the technology described here can be used according to an embodiment in order to create further interaction options between the building system 1 and the users 2, 2a. The technology described here uses facial recognition technology that is based on a comparison of a real-time face template of a user 2, 2a with stored reference face templates of registered users 2, 2a. The technology described here also uses one or more communication services, such as a telephone service, a text message service, an email service or a social media service (chat apps). Such services, including their technical properties, for example with regard to transmission medium (for example, radio, cable, Internet), addressing (uniform resource locator (URL) and transmission protocol (for example, Internet protocols such as internet protocol (IP)), transmission control protocol (TCP), user datagram protocol (UDP), hypertext transfer protocol (HTTP), simple mail transfer protocol (SMTP), file transfer protocol (FTP)) are known to those skilled in the art. Well-known social media or social networks are known, for example, under the following names: Facebook, Instagram, WhatsApp and WeChat.

Figure 2:
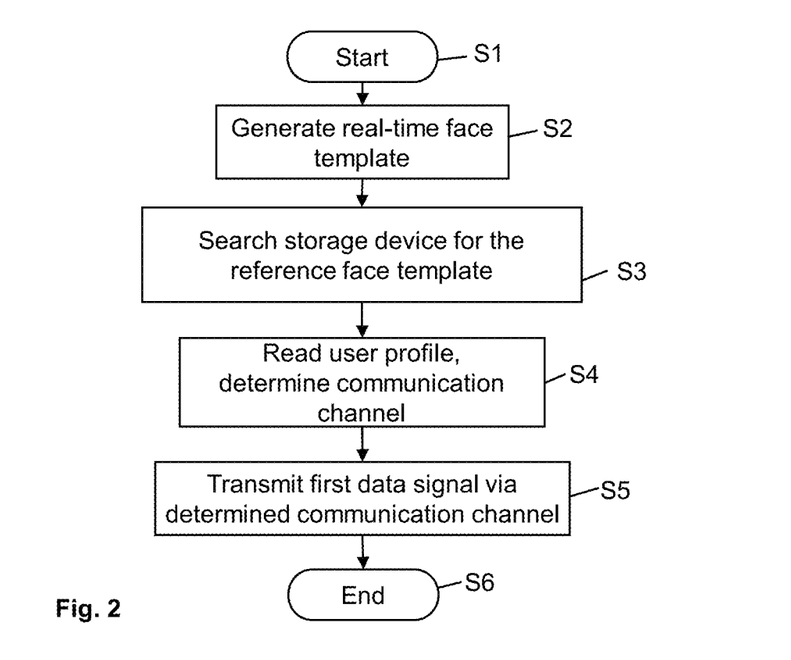
FIG. 2 is a flowchart of an embodiment of a method for operating an access control system.

FIG. 2 shows an example of a flowchart of a first embodiment of a method for operating the building system 1. The method begins in a step S1. If a user 2, 2a is in the building zone 12 in a detection area of the camera system 4, the image processing device 22 generates a real-time face template of the user 2, 2a from a camera capture of the user 2, 2a in a step S2. Controlled by the control and processing device 8, in a step S3, the storage device 26 is searched for a reference face template that matches the real-time face template to a specified degree; if they match, it is a registered user 2, 2a for whom a user profile is stored in the storage device 26. In a step S4, the control and processing device 8 reads the user profile of this user 2, 2a in order to determine a bidirectional communication channel 18 for communication between the building system 1 and the user 2, 2a. The communication channel 18 indicates how the user 2, 2a would like to communicate with the building system 1, or which communication service is to be used for this, in particular how the user 2, 2a would like to be contacted by the building system 1, for example when they enter the building. If the communication channel 18 is determined, a data signal can be transmitted to the mobile phone 6 of the user 2 via the communication channel 18 in a step S5. The method ends in a step S6.

Figure 3:
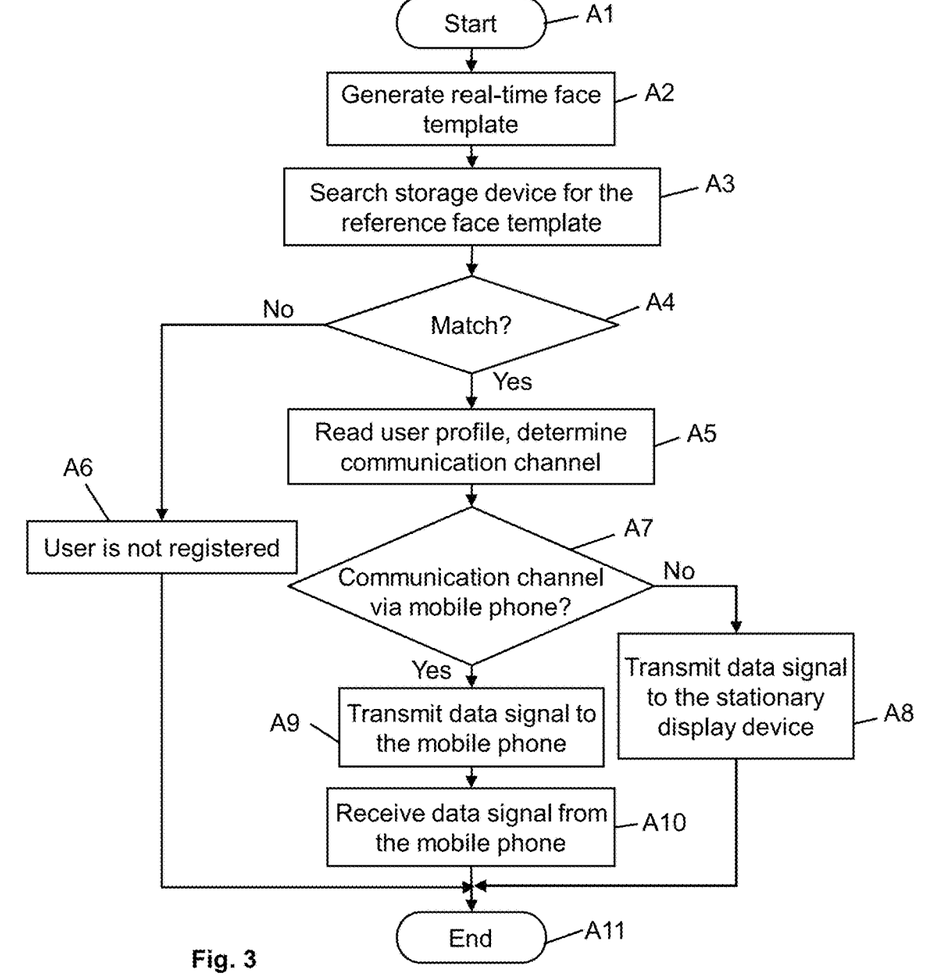
FIG. 3 is a flowchart of a second embodiment of a method for operating the building system.

FIG. 3 shows an example of a flowchart of a second embodiment of a method for operating the building system 1. The method begins in a step A1 and ends in a step A11; between these, the method comprises steps A2, A3, A5 and A9, which will not be discussed in more detail below because they substantially correspond to the steps S2, S3, S4 and S5, respectively, of the method shown in FIG. 2.

In a step A4, a check is made to determine whether there is a match—that is, whether a reference face template is determined during the search in step A3, which reference face template matches the real-time face template to a specified degree. If there is a match, i.e., if it is a registered user 2, 2a, the method proceeds along the yes branch to step A5, and reads the user profile of the user 2, 2a. If, on the other hand, there is no match, the method proceeds along the No branch to step A6.

In step A6, the user 2, 2a is defined as an unregistered user; the method then ends in step A11. Since no reference face template was found in steps A3, A4 that matches the real-time face template, the user 2, 2a can be an unregistered user 2, 2a, for example a visitor, or a registered user 2, 2a who is mistakenly not recognized by facial recognition. From the point of view of the building system 1, both cases involve an unregistered user. In such a case, the erroneously unrecognized user 2, 2a can, for example, contact a customer service counter (for example, the reception or porter) and identify themself there in a different way. On the other hand, depending on the design of the building, visitors can be guided to a visitor information desk by means of a guide, or be addressed by building staff.

In step A5, the communication channel that is specified by the user 2, 2a as preferred in the user profile is determined. In a step A7, it is determined whether the communication channel is established via a mobile phone 6. As explained above, the user 2a does not carry a mobile phone 6 with them. It is stipulated for this user 2a in their user profile that the communication channel is established via the information device 14. The information device 14 can, for example, display building-specific information (for example, building map information, site plan information), situation-specific information (for example, routing/orientation information, elevator information), and/or personalized information (for example, notifications, messages), with or without a voice message or prompt for an input. In the case of this user 2a, the method proceeds along the No branch to a step A8. In step A8, the control and processing device 8 transmits a data signal to the information device 14 in order to display the information. The method then ends in step A11.

As shown in FIG. 1, the user 2 is carrying a mobile phone 6 with them. In one embodiment, one of the communication services mentioned is defined as a preferred communication channel for this user 2 in their user profile, such that communication takes place via the mobile phone 6. In addition, alternative communication channels can be defined in the user profile, but these are not considered preferred and are only used in exceptional cases. An exceptional case can exist, for example, if the preferred communication channel is not available. The information device 14 can also be defined as a communication channel for the user 2 (for example, in the event that there is a system interruption or the mobile phone 6 is not available or ready for use); in this case, the information can be conveyed via the information device 14, as described in conjunction with step A8.

If it is determined in step A7 that the communication channel will be established via a mobile phone 6, the method proceeds along the Yes branch to step A9. In step A9, the control and processing device 8 transmits a (first) data signal to the mobile phone 6 in order to initiate the transmission of the information there, for example by displaying the information on a display device of the mobile phone 6. The information can comprise the building-specific, situation-specific and/or personalized information mentioned. In one embodiment, the method then ends in step A11. In a further embodiment, as shown in FIG. 3, the control and processing device 8 waits for a (second) data signal transmitted by the mobile phone 6. In FIG. 3, the mobile phone 6 transmits this data signal to the transmitting and receiving device 8 in a step A10. The data signal can, for example, comprise a message that constitutes a response to the received (first) data signal—for example, a confirmation or modification of the message, or a response to the message or an input as a response to the message.

A person skilled in the art recognizes that a plurality of users 2, 2a can be in the building zone 12 at a certain point in time. A person skilled in the art recognizes that in such a case, the method according to FIG. 2 or the method according to FIG. 3 can be carried out for several of these users 2, 2a, or for all of them. Depending on the number of users 2, 2a, the execution can take place substantially simultaneously, or one after the other. If several of the users 2 present desire a communication channel via their respective mobile phones 6, there is a bidirectional private communication channel for each of these users 2.

The communication channel determined according to FIG. 2 and FIG. 3 can be used as follows in an embodiment that does not restrict the scope of protection: If it is recognized that a registered user 2 (with a mobile phone 6) prefers a chat service as a communication channel, the control and processing device causes the chat service to transmit a message to the mobile phone 6 of the user 2—that is, the user 2 is contacted by their preferred private communication channel. For this purpose, they use their familiar mobile phone 6.

The message can comprise, for example, a greeting by name, an inquiry as to which building action is desired at the given time, and/or a request to confirm a building action suggested by the building system 1 according to the user profile. The reaction of the user 2 (response or confirmation) takes place, for example, in step A10 (FIG. 3), in that the mobile phone 6 of the user 2 transmits a corresponding data signal to the control and processing device.

In one embodiment, the control and processing device can use what is known as a chatbot for bidirectional communication with the user 2 via the communication channel. A chatbot (also called chatterbot, bot or virtual personal assistant) is a text-based dialog system that allows chatting, i.e., electronic communication using written text in real time (usually via the Internet) with a technical system. A chatbot can, for example, respond to special commands; recognizing a registered user 2 can, for example, trigger a greeting or a specific message. Technically, a chatbot is therefore similar to a full-text search engine that, in response to a command, searches a defined database for a corresponding reaction; as a result, a relatively intelligent private dialogue with the user 2 is also possible.

The general communication described in the previous embodiment via the private communication channel preferred by the user 2 can be used in the building for special applications, for example in conjunction with an access control system and/or an elevator system. As mentioned above, in one embodiment, the building system 1 may be a subsystem or subordinate system of an access control system, and/or of the elevator system 16. An access control system can, for example, monitor the building zone 12 so that only authorized users 2, 2a can get into the rooms 5 or the elevator system 16, for example by blocking or releasing a door, a gate, a turnstile, or another physical barrier or lock, by controlling (for example, activating) an alarm device for instances where there is access but no physical barrier when an unauthorized user 2, 2a is detected, or by combining these measures. The alarm device may, for example, trigger a visual and/or audible alarm or initiate a notification of a security service. The rooms 5 shown in FIG. 1 can, for example, belong to a group of elevators (for example, elevators A, B). If a user 2, 2a is recognized, this can mean in one embodiment that the user 2, 2a wants access and wants to be transported with one of the elevators to a destination floor specified for this user 2, 2a. In one embodiment, a destination call can be initiated for the user 2, 2a, to which an elevator controller assigns an elevator. The assigned elevator can be communicated to the user 2, 2a via the preferred communication channel. Access control systems and elevator systems, and their functionalities, are known to a person skilled in the art. Such a person skilled in the art may be a person skilled in the art of access control systems and/or elevator systems. As such, further explanations regarding the structural and functional properties of these systems do not appear to be necessary.

In one embodiment, a registered user 2 has specified in their user profile that a private communication channel is to be used via their mobile phone 6. The user 2 can be a user who enters the building regularly, for example every day, because they live or work there. It can also be a visitor for whom a temporary user profile (visitor profile) was previously created. The relevant reference face template can be generated from a photo on which the face of the user 2 is clearly visible, which the visitor transmits to their host, for example by e-mail. In addition to the data mentioned above, the temporary user profile can comprise appointment information and information about the host, for example name, telephone number, floor and/or apartment or office number, and about the visitor (for example the name or status (VIP) of the visitor). In addition, a time window may be specified, within which the visitor is to be granted access. The time window may indicate, for example, that the visitor 2 has access approximately half an hour before and after the beginning of the appointment, in case the visitor 2 arrives too early or is delayed. The user profile may be deleted after the arrival of the visitor 2 or at a later point in time. The technology described here is particularly advantageous for visitors, because visitors do not need a system- or building-specific app, and can use their usual services.

If the user 2 was recognized as a registered user by the building system 1, the user 2 is granted access by the access control system. In this case, they can be contacted by the building system 1 via the private communication channel in accordance with one of the services mentioned. In one case, the contacting may only include a greeting, possibly together with current building information. A visitor can be told which room 5 their host is in and how to get there. In a further case, contacting may comprise a request, for example, whether a specific building action is desired. The building action can consist, for example, of a destination call for the elevator system 16 being initiated for the user 2, either according to the data of the user profile existing for this user 2 or according to a call input on the mobile phone 6, which is transmitted to the building system 1 via the private communication channel. The user 2 can also input a destination or a location in the building (for example, a shop, department store, company, parking garage, restaurant, public toilets, etc.). The destination or location can be selected by the user 2, for example from a list that is transmitted in advance from the building system 1 via the private communication channel to the mobile phone 6. The building system 1 then informs the user 2 via the private communication channel of the assigned elevator or the desired destination/location information—for example, a route to take, with or without a building map.

In one embodiment, the access control system 1 is connected to an elevator system, in particular to an elevator controller. The communication between the building system 1 and the elevator controller can take place via the communication network 37 (as indicated in FIG. 1). For example, if the access control takes place in the entrance hall of the building through which users 2 must pass in order to arrive at the elevators, a destination call may be initiated with each access granted to the user 2 in question. The elevator control of the elevator system processes the destination call and assigns it an elevator. The elevator assigned to the destination call can be communicated to the user 2 via the private communication channel. The user 2 may thus go directly to the assigned elevator without having to input an elevator call.

Adding to the understanding of the mode of operation of the building system 1 described above by way of example, the following provides a description of examples of components of the building system 1 and their functionalities, in conjunction with FIGS. 1 and 4.

The communication network 10 can comprise a building's internal communication network to which the camera system 4 and the information device 14 are connected within the building. In one embodiment, the control and processing device 8 can be connected to the building's internal communication network, in particular if the control and processing device 8 is also arranged in the building. The building's internal communication network can comprise a wired network topology (for example, a bus, ring, mesh topology) and/or a radio-based network topology (WLAN). In a further embodiment, the control and processing device 8 can be located entirely or partially at a site which is remote from the building. In this case, the control and processing device 8 can be connected to the building's internal communication network via an external communication network. For this purpose, an interface device is present in the building's internal communication network, which enables communication between the building's internal network and the external communication network.

FIG. 4 shows a schematic illustration of an embodiment of the building system 1, with components of an embodiment of the control and processing device 8 included. In addition to the above-mentioned image processing device 22 (image processing in FIG. 2) and the storage device 26 (memory in FIG. 2), also mentioned above, the control and processing device 8 comprises a communication device 24 (COM in FIG. 2) and a processor 20 (μP in FIG. 2). A person skilled in the art will recognize that the arrangement of the components shown represents an example of a basic structure of the building system 1, wherein the components can be arranged in a unit (for example, in a housing, computer system or server system) or can be spatially distributed, for example by the cloud computing infrastructure named above.

The storage device 26 comprises, for example, a hard disk drive (HDD), a CD/DVD drive, a semiconductor drive/solid state disk (SSD), or combinations thereof, or other storage devices for digital data; as shown in FIG. 4, it is connected to the image processing device 22 and comprises a database system 28 (also called a database 28, DB in FIG. 2). The database system 28 consists of two parts: management software, called a database management system, and a set of data to be managed. The management software organizes the structured storage of the data internally, and controls all reading and writing access to the database. In one embodiment, the database system 28 is a relational database system. A database system offers a database language for querying and managing the data—by way of example, the language SQL for a relational database system.

The database system 28 stores a data set for each registered user 2, 2a, which is also referred to as a user profile. The user profile comprises personal data of the user 2, 2a (for example, name, reason for authorization (resident, employee, external service provider, visitor)), access authorizations (for example, certain rooms 4 and floors) and any potential time restrictions (for example, access from Monday to Friday, from 7:00 a.m. to 8:00 p.m.). The user profile also specifies how the user 2, 2a would like to be contacted when they are in the building. At least one communication channel can be specified for this. If a plurality of communication channels is defined, one of them can be defined as the preferred communication channel. The user 2, 2a can define, for example by one or more rules and/or conditions, when a different communication channel is to be used. For example, a ranking can be established; if the preferred communication channel (for example, a special chat service) is not available, another chat service should be used, for example, before a telephone service is selected. For example, a rule can specify times during which the private communication channel is to be selected.

The connection between the image processing device 22 and the database system 28 is configured in such a way that the image processing device 22 can query (or access) the data stored in the database system 28. In particular, the database management system can search for a stored reference face template that matches the real-time face template.

In the embodiment shown, the processor 20 is connected to the image processing device 22 and to the communication device 24. The result of the image processing can be transmitted to the processor 20 through the connection to the image processing device 22—that is, the user 2, 2a is either registered or not registered based on the image processing. An unregistered user can be ignored by the building system 1 or they can be addressed by a supervisor (see step A6 in FIG. 3). If, on the other hand, the user 2, 2a is registered, a computer program implemented in the processor 20 carries out one of the methods shown in FIG. 2 and FIG. 3.

In the embodiment shown, the image processing device 22 and the communication device 24 are each connected to the communication network 10. The image processing device 22 can receive camera captures from the camera system 4 via the communication network 10 without this reception taking place through the communication device 24. In a further embodiment, the image processing device 22 can be connected to the communication device 24 for receiving the camera captures. In FIG. 2, these options for connecting the image processing device 22 to the communication network 10 for receiving the camera captures are indicated by the communication connection 30. A person skilled in the art will recognize that the communication link 30 can be established in a variety of ways—for example, using wired transmission technologies (such as point-to-point connections and/or bus systems) and/or radio technologies.

The camera system 4 generates a camera capture of a user 2, 2a (in particular their face) who is in the detection range of the camera system 4 when the user 2, 2a is in the building zone 12. In one embodiment, the camera system 4 comprises a digital camera with selectable and/or adjustable properties; in this embodiment, camera captures are therefore available as digital data sets (digital camera capture (also referred to as a digital image)). The properties of the digital camera—for example, resolution (for example, indicated in megapixels), exposure and focal length, are selected or adjusted in such a manner that a camera image (digital image) may be evaluated, and the face of the user 2, 2a may be recognized in evaluable quality on the digital image. The digital image is, for example, in a JPEG format, but it may also be in a different format—for example, in BMP format or in JPEG2000 format.

The camera system 4 can be equipped with a sensor module, or connected to a separate sensor module, which activates the camera system 4 when it detects the presence of a user 2, 2a in the detection range of the camera system 4. The sensor module may comprise, for example, a proximity sensor, which may be configured as an ultrasonic sensor, an infrared sensor or an optical sensor (for example, light barrier, brightness sensor). Alternatively, the presence of a user 2, 2a in the detection area of the camera 4 may be recognized in one embodiment as a result of changes detected in the detection area. If, for example, the user 2, 2a enters the detection area and the camera system 4 is always in an active state, the camera system 4 captures changes in front of a substantially static background; these changes are interpreted as presence.

A person skilled in the art will recognize that the camera system 4 can be configured in one embodiment with an image processing function. In this case, the image processing device 22 in the control and processing device 8 can be omitted. Depending on the configuration of the building system 1, several camera systems 4 can be present, for example in an entrance hall and on individual floors of the building.

The image processing device 22 comprises at least one processor unit that executes a computer-aided method for image processing. Image processing methods are known, for example from U.S. Pat. No. 8,494,231 B2. A basic illustration of the image processing for the purpose of facial recognition is described in the publication "Gesichtserkennung" ["Facial Recognition"] of the German Federal Office for Information Security (available under the topic of biometrics at the Internet address www.bsi.bund.de). This publication distinguishes between the three main steps "Create template," "Create reference dataset," and "Compare facial images." In order to make the comparison of two facial images as simple and quick as possible, the features of a face are ascertained and stored in the form of a feature dataset referred to as a "face template." When the face on an image of a user has been found and standardized, features in addition to the eyes, nose, and mouth/chin are sought, measured, and related to each other. These extracted features are encoded, compressed, and stored as a feature dataset (face template). The similarity of the face templates of two facial images is determined by combining them using a mathematical algorithm. This results in a degree of similarity of the face templates. If the result is within certain tolerance limits, the two face templates, and thus their underlying facial images, are classified as identical.

With reference to FIGS. 2 and 3, steps S3 and A4 check whether the real-time face template matches a reference face template to a specified degree. In one embodiment, the real-time template and the reference templates each comprise a specified number of specified facial parameters and their values (for example, eye distance, mouth width, distance between lip top edge and lip bottom edge, distance between nose and lip bottom edge, etc.). During the search, the parameter values of the real-time template are compared with the parameter values of the reference templates. There is a match when the degree of similarity of the templates is at least equal to the specified degree. The specified degree indicates a percentage match of the facial parameters of the real-time template with the facial parameters of a reference template. Depending on the accuracy requirement, the specified degree may be selected, for example, to be between approximately 60% and approximately 90%.

The mobile phone 6 can be, for example, a mobile phone, a smartphone, a tablet PC or a smartwatch, these devices usually being equipped with hardware that enables communication via a local radio network (WLAN/WiFi) and/or a global mobile radio network according to a mobile radio standard (for example, GSM, LTE, G4, G5).

However, the mobile phone 6 may also be miniature computer goggles or another body-worn computer-aided device (also referred to as a "wearable device") when these devices are intended for near-field communication. Depending on the configuration of the mobile phone 6, it can comprise application-specific software (so-called apps), for example, and can have a graphical user interface (GUI) in order to be able to selectively activate and deactivate its functions (for example, individual apps).

The invention claimed is:

1. A method for operating a building system for a building, wherein the building system has a camera system, an image processing device, a control and processing device communicatively connected to the image processing device, a storage device communicatively connected to the control and processing device, and a communication device communicatively connected to the control and processing device, wherein the camera system is arranged in a building zone which is accessible for users who carry mobile phones and for users who do not carry mobile phones, wherein the storage device stores a plurality of user profiles, a respective one of the user profiles being assigned to a respective user registered with the building system and containing data associated with a reference facial template of the registered user, the method comprising:

determining the user is in the building zone, generating a real-time face template of facial features of a user in response to determining that the user is in the building zone, the real-time face template being generated by the image processing device from a camera capture by the camera system of the user;

searching, controlled by the control and processing device, the storage device for a reference face template stored in the storage device which matches the real-time face template to a specified degree, determining that there is a match between the real-time face template and the reference face template to the specified degree, wherein, in response to determining the match, the user is recognized as a registered user for whom a user profile is stored in the storage device;

reading the user profile of the user by the control and processing device to determine that the read user profile contains information about a user-specified, preferred bidirectional communication channel via a mobile phone of the user and through which for private communication of data between the building system and the user is to be effected;

in response to determining that the user-specified, preferred bidirectional communication channel is contained in the user profile, transmitting, controlled by the control and processing device, a first data signal by the communication device via the determined bidirectional communication channel to the mobile device of the user, to be provided there to the user as a message;

receiving a second data signal via the determined bidirectional communication channel by the communication device, wherein the message conveyed by the first data signal comprises user-specific information and wherein the second data signal comprises a confirmation, rejection or modification of the user-specific information; and generating, by the control and processing device, a control signal as a function of the second data signal, wherein the control signal relates to an execution of a building action specified by the user-specific information.

2. The method of claim 1, wherein the bidirectional communication channel comprises a telephone service, an email service, a multimedia or text messaging service or a social media service, wherein the bidirectional communication channel is used by the user by a mobile phone.

3. The method of claim 1, in which the user-specific information relates to an elevator call.

4. The method of claim 1, further comprising transmitting the first data signal to an information device which is arranged in the building zone in response to determining the user profile does not contain any information about a bidirectional communication channel, or in response to determining the user is a user without a mobile phone.

5. A building system for a building, the system comprising:
 a camera system arranged in a building zone which is accessible to users carrying mobile devices and to users not carrying mobile devices,
 an image processing device which is communicatively connected to the camera system and which is configured to generate a real-time face template of facial features of the user from a camera capture by the camera system of a user when the user is in the building zone;
 a storage device in which a plurality of user profiles is stored, a respective one of the user profiles being assigned to a respective user registered with the building system and containing data associated with a reference facial template of the registered user;
 a communication device configured to transmit and receive data signals over a communication network; and
 a control and processing device which is communicatively connected to the image processing device, the storage device, and the communication device, wherein the control and processing device is configured to:
  search the storage device for a reference face template that matches the real-time face template to a specified degree, wherein the user is a registered user if there is a match,
  read the user profile of the user to determine that the read user profile contains information about a user-specified, preferred bidirectional communication channel via a mobile phone of the user and through which for private communication of data between the building system and the user is to be effected,
  cause a first data signal to be transmitted to the user by the communication device via the bidirectional communication channel determined for the user in response to determining that such communication channel is contained in the user profile, to be provided there to the user as a message, wherein the message conveyed by the first data signal comprises user-specific information;
  process a second data signal received by the communication device via the determined bidirectional communication channel, wherein the second data signal comprises a confirmation, rejection or modification of the user-specific information; and
  generate a control signal as a function of the second data signal, wherein the control signal relates to an execution of a building action specified by the user-specific information.

6. The system of claim 5, wherein the bidirectional communication channel comprises a telephone service, an email service, a multimedia or text messaging service or a social media service, wherein the bidirectional communication channel can be used by the user by a mobile phone.

7. The system of claim 5, in which the control and processing device is also configured to transmit the first data signal to an information device which is arranged in the building zone if the user profile does not contain any information about a bidirectional communication channel, or if the user is a user without a mobile phone.

* * * * *